(12) United States Patent
Wolff

(10) Patent No.: US 7,055,300 B2
(45) Date of Patent: Jun. 6, 2006

(54) CUTTING MACHINE, PARTICULARLY AN AGRICULTURAL MOWER WHOSE PLACING IN TRANSPORT POSITION IS SIMPLIFIED

(75) Inventor: Michel Wolff, Waltenheim sur Zorn (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 11/071,253

(22) Filed: Mar. 4, 2005

(65) Prior Publication Data
US 2005/0210849 A1 Sep. 29, 2005

(30) Foreign Application Priority Data
Mar. 9, 2004 (FR) .................................. 04 02460

(51) Int. Cl.
A01D 75/30 (2006.01)
(52) U.S. Cl. ............................................................ 56/6
(58) Field of Classification Search .................... 56/6, 56/14.9, 15.2, 15.7, 15.8, 15.9, 15.1, 17.4, 56/320.1, 320.2, DIG. 20; 172/456, 501, 172/311
See application file for complete search history.

(56) References Cited

U.S. PATENT DOCUMENTS

| RE31,209 E * | 4/1983 | Anderson | 172/311 |
|---|---|---|---|
| 4,557,104 A | 12/1985 | Toillie et al. | |
| 4,730,445 A | 3/1988 | Wolff | |
| 4,761,940 A | 8/1988 | Wolff | |
| 5,101,616 A | 4/1992 | Wolff | |
| 5,135,057 A * | 8/1992 | Dircks | 172/456 |
| 5,241,809 A | 9/1993 | Wolff et al. | |
| 5,353,579 A | 10/1994 | Wolff | |
| 5,353,580 A | 10/1994 | Wolff | |
| 5,724,794 A | 3/1998 | Wolff | |
| 5,727,371 A * | 3/1998 | Kieffer et al. | 56/6 |
| 5,852,921 A | 12/1998 | Neuerburg et al. | |
| 5,857,314 A | 1/1999 | Wolff | |
| 5,896,733 A * | 4/1999 | Neuerburg et al. | 56/15.2 |
| 5,934,050 A * | 8/1999 | Neuerburg et al. | 56/6 |
| 6,125,619 A | 10/2000 | Wolff | |
| 6,128,892 A * | 10/2000 | Neuerburg et al. | 56/6 |
| 6,311,464 B1 * | 11/2001 | Neuerburg et al. | 56/15.2 |
| 6,345,490 B1 | 2/2002 | Wolff | |
| 6,349,529 B1 * | 2/2002 | Neuerburg et al. | 56/14.9 |
| 2003/0041580 A1 * | 3/2003 | Ewanochko et al. | 56/255 |

FOREIGN PATENT DOCUMENTS

| DE | 203 06 314 U 1 | 9/2003 |
|---|---|---|
| EP | 0 839 443 A1 | 5/1998 |

* cited by examiner

Primary Examiner—Árpád Fábián Kovács
(74) Attorney, Agent, or Firm—Oblon, Spivak, McClelland, Maier & Neustadt, P.C.

(57) ABSTRACT

The present invention proposes a cutting machine comprising:
  a cutting mechanism,
  a hitch structure able to be raised relative to the ground,
  a carrier beam connected to said cutting mechanism by means of a first pivot articulation and to said hitch structure by means of a second pivot articulation,
  an operating member intended to pivot said cutting mechanism from a working position to a transport position,
  a limiter device intended to limit the pivoting of said cutting mechanism so as to stop it in an intermediate position when said operating member is actuated, and
  a device intended to automatically render said limiter device inactive when said hitch structure occupies a raised position relative to the ground.

23 Claims, 13 Drawing Sheets

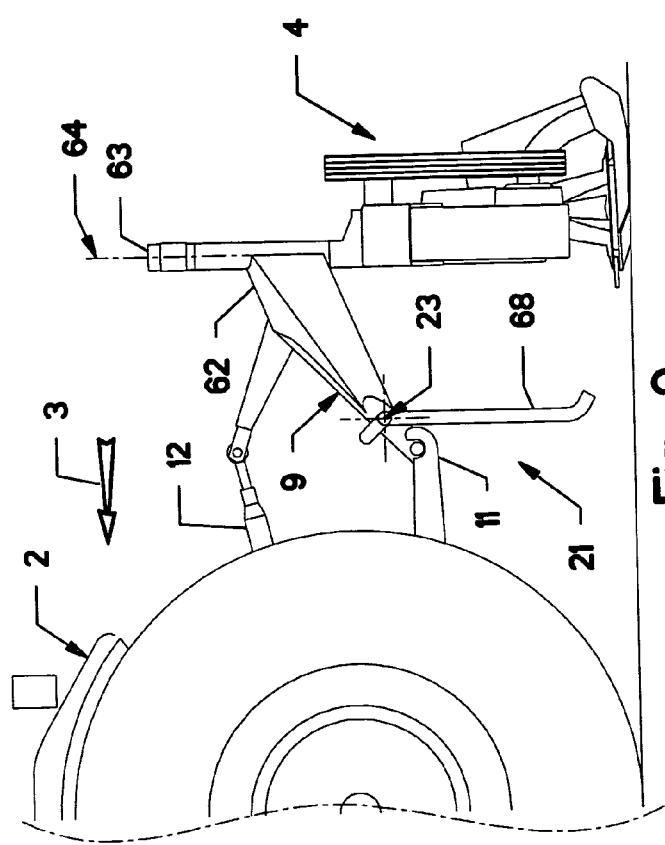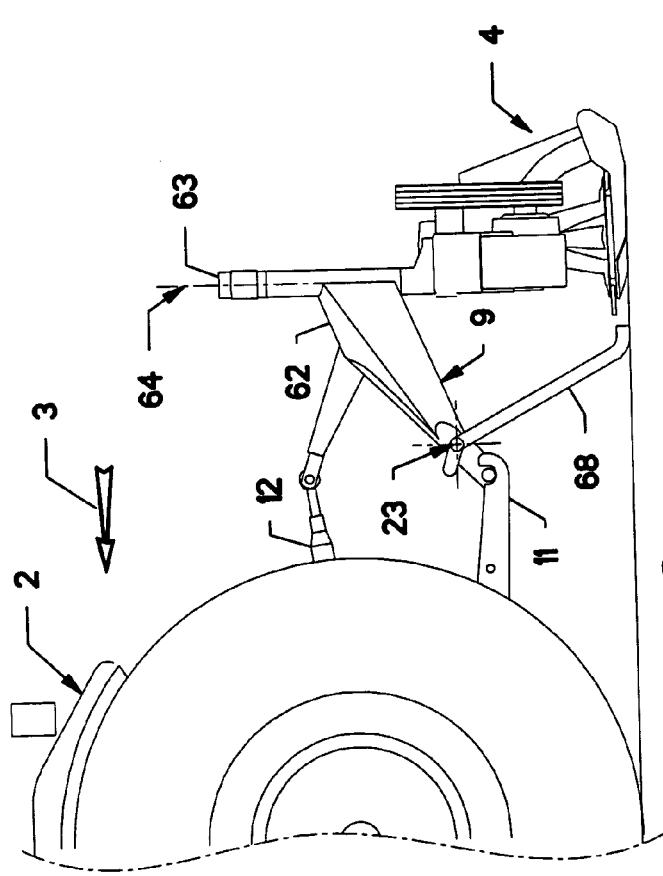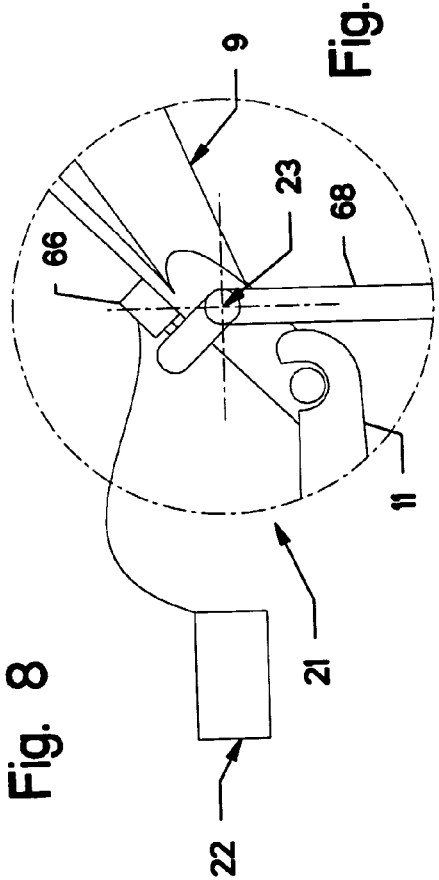

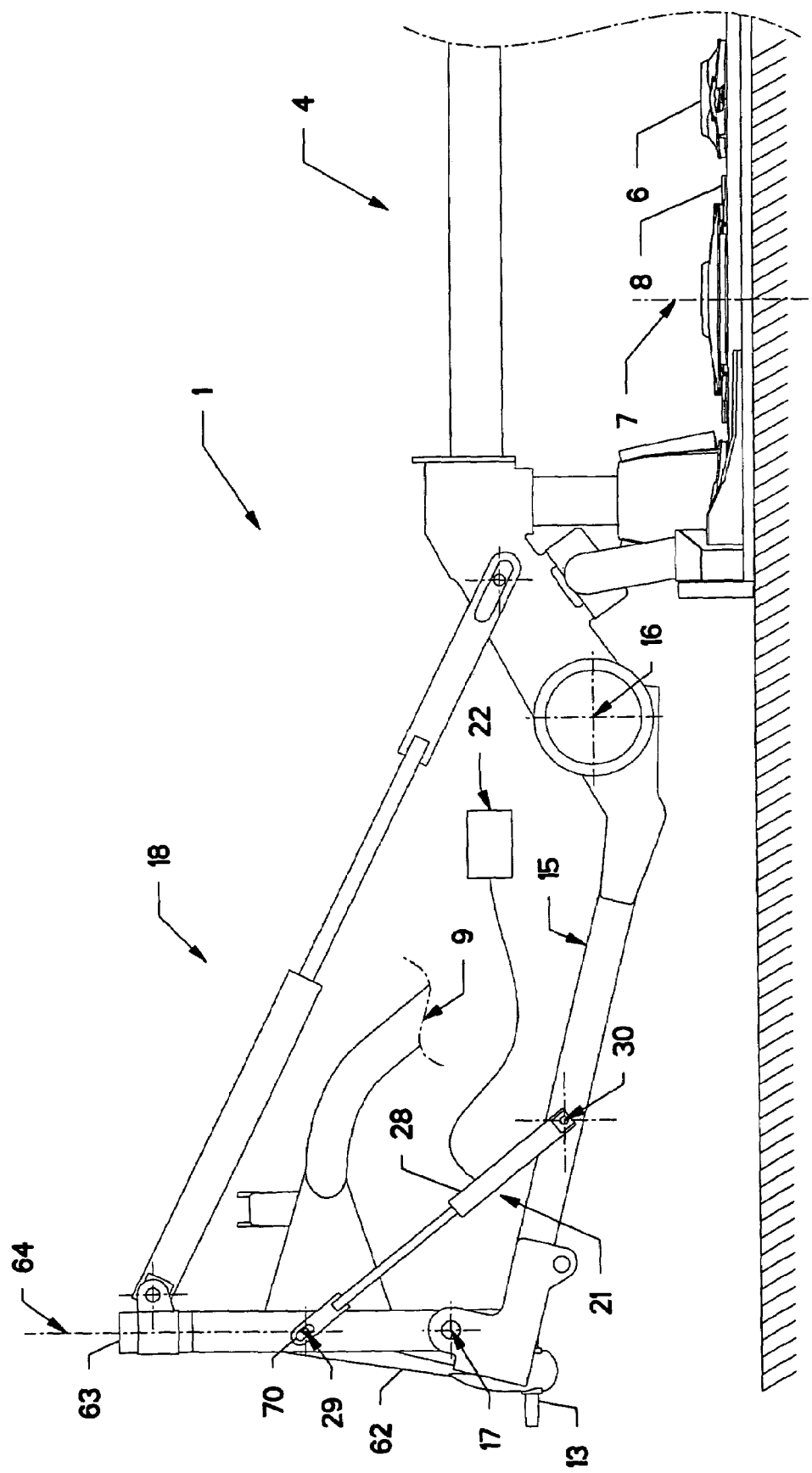

CUTTING MACHINE, PARTICULARLY AN AGRICULTURAL MOWER WHOSE PLACING IN TRANSPORT POSITION IS SIMPLIFIED

BACKGROUND OF THE INVENTION

1. Field of the Invention

The present invention relates to the general technical field of agricultural machinery. It relates more precisely to a cutting machine comprising:

- a cutting mechanism,
- a hitch structure intended to be connected to a hitch device of a motor vehicle, said hitch structure being capable of being raised or lowered relative to the ground,
- a carrier beam connected on the one hand to said cutting mechanism by means of a first pivot articulation whose axis is at least substantially directed along a direction of work, and on the other hand to said hitch structure by means of a second pivot articulation whose axis is substantially parallel to the axis of said first pivot articulation,
- an operating member intended to cause said cutting mechanism to pivot from a working position in which said cutting mechanism rests at least partially on the ground, to a transport position in which said cutting mechanism is pivoted upward, and
- a limiter device intended to limit the upward pivoting of said cutting mechanism relative to said carrier beam about said first pivot articulation, so as to stop said cutting mechanism in an intermediate position when said operating member is actuated.

2. Discussion of the Background

Such a cutting machine is described in document DE 91 12 331 U1. On this known machine, the operating member is achieved by means of a cylinder connected in pivoting manner on the one hand to the hitch structure and on the other hand to the cutting mechanism. The limiter device is achieved by means of a connecting rod one of whose ends is connected in pivoting manner to the cutting mechanism. The other end of the connecting rod slides in a groove provided on the carrier beam. When looking in a direction from the cutting mechanism to the hitch structure, this groove delineates a first relatively rectilinear and horizontal section then a sharp change of direction upward, and finally a second relatively rectilinear section. During work, the end of the connecting rod slides on the first rectilinear section of said groove. The cutting mechanism may then pivot freely about said first articulation so as to follow the unevennesses of the ground. When the user instigates a shortening of the cylinder, said cutting mechanism pivots about said first articulation until the end of said connecting rod presses against the sharp change of direction of the groove. The cutting mechanism thus stops in the intermediate position. If the user wishes to pivot the cutting mechanism more in order to reach the transport position, he must then pull on a rope to make the end of said connecting rod move above the sharp change of direction. With this known cutting machine, placing in transport position is not practical to achieve. The user must in fact simultaneously pull on the rope and instigate the shortening of the cylinder.

SUMMARY OF THE INVENTION

The aim of the present invention is to simplify the placing in transport position of such a cutting machine.

Accordingly, the cutting machine according to the present invention is characterized in that it also comprises a device intended to automatically render said limiter device inactive when said hitch structure occupies a raised position relative to the ground.

During work, the hitch structure occupies a normal position relative to the ground. The limiter device is therefore active. If the user acts on the operating member in order to cause the cutting mechanism to pivot upward, the latter will then stop in the intermediate position. To place the cutting mechanism in the transport position, the user first places the hitch structure in a raised position relative to the ground by acting for example on the hitch device of the motor vehicle. Thanks to the main feature of the present invention, the limiter device is from now on advantageously inactive. Consequently, if the user acts on the operating member in order to cause the cutting mechanism to pivot upward, the latter can reach the transport position. With the present invention, the user no longer has to pull on a rope to allow the placing in transport position of said mower.

BRIEF DESCRIPTION OF THE DRAWINGS

Other features of the invention, to be considered separately or in all their possible combinations, will further appear in the following description of exemplary, nonlimiting embodiments of the invention, shown in the appended drawings in which:

FIG. 8 shows, seen from the side, an additional exemplary embodiment of an agricultural mower according to the present invention, FIG. 9 shows the mower of FIG. 8, the hitch structure being in raised position relative to the ground, FIG. 10 shows an enlargement of FIG. 9, FIG. 12 shows, seen from behind, another exemplary embodiment of an agricultural mower according to the present invention.

DESCRIPTION OF THE PREFERRED EMBODIMENTS

Figure 1:
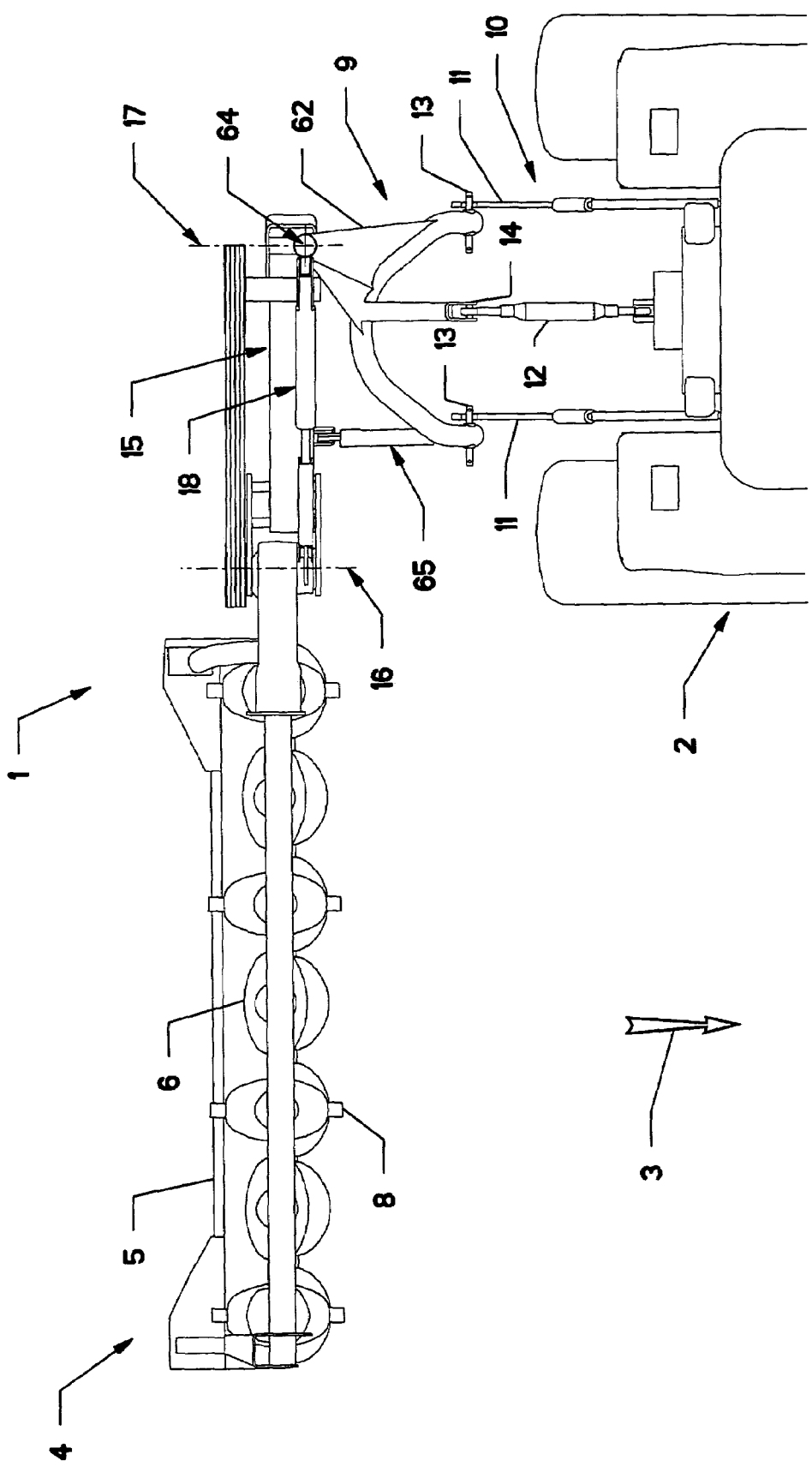
FIG. 1 shows, seen from above, an agricultural mower according to the present invention hitched to a tractor.

FIG. 1 shows, seen from above, a cutting machine according to the present invention, and more precisely a mower 1. Said mower 1 is hitched to a motor vehicle 2 which pulls it in a forward line and direction shown by the arrow 3. In the rest of the description, the following concepts "forward" and "back", "in front" and "behind" are defined relative to the direction of travel 3 and the concepts of "right" and "left" are defined looking at said mower 1 from the rear in the direction of travel 3.

Said mower 1 comprises a cutting mechanism 4 intended to cut a standing product, such as grass for example. In a manner known to those skilled in the art, said cutting mechanism 4 comprises a gearbox 5 and cutting members 6. As emerges in particular from FIGS. 1 and 2, during work, said gearbox 5 rests at least partially on the ground, transverse to said direction of travel 3. Said cutting members 6 are arranged side by side above said gearbox 5. In addition, each cutting member 6 is connected in pivoting manner to said gearbox 5 by means of a respective articulation whose axis 7 is directed upward. During work, said cutting members 6 are driven in rotation about their respective axis 7. Cutting elements 8 arranged on the periphery of said cutting members 6 thus describe high speed circles and cut the standing product. The rotary motion of said cutting members 6 originates from a power take-off present on said tractor 2. Transmission members are provided to transfer the rotary motion of said power take-off to each cutting member 6. Such transmission members are known to those skilled in the art. They are in particular telescopic shafts with universal joints, pulley-belt systems, angle transmission gearboxes, and gears arranged inside said gearbox 5.

Said mower 1 also comprises a hitch structure 9 intended to be connected to a hitch device 10 of said motor vehicle 2. In the exemplary embodiment shown in FIG. 1, said hitch device 10 is advantageously of the "three-point" type. Thus, in a manner known to those skilled in the art, said hitch device 10 comprises two lower hitch arms 11 and one top hitch arm 12. One end of each lower hitch arm 11 is connected in pivoting manner to the chassis of said motor vehicle 2. The other end of each lower hitch arm 11 is connected in pivoting manner to a respective lower hitch point 13 of said hitch structure 9. In a similar fashion, one end of said top hitch arm 12 is connected in pivoting manner to the chassis of said motor vehicle 2. The other end of said top hitch arm 12 is connected in pivoting manner to a top hitch point 14 of said hitch structure 9. Said hitch device 10 thus consists of a deformable quadrilateral capable of raising or lowering said hitch structure 9 relative to the ground. Accordingly, said hitch device 10 further comprises one or more operating members, for example hydraulic cylinders, intended to cause said lower hitch arms 11 to pivot relative to the chassis of said motor vehicle 2. According to standard ISO 730-1 governing the hitch devices of the "three-point" type, between the lowest position and the highest position, the vertical travel of the end of the lower hitch arm 11 connected to the agricultural machine is at least approximately 70 centimeters. Thus, as an example, the vertical travel of said hitch structure 9 between a working position and a raised position relative to the ground is a minimum of 10 centimeters.

Said mower 1 also comprises a carrier beam 15. One end of said carrier beam 15 is connected to said cutting mechanism 4 by means of a first pivot articulation 16 whose axis is directed during work at least substantially along said direction of travel 3. The other end of said carrier beam 15 is connected to said hitch structure 9 by means of a second pivot articulation 17 whose axis is at least substantially parallel to the axis of said first articulation 16. Said carrier beam 15, said first articulation 16 and said second articulation 17 advantageously allow said cutting mechanism 4 to follow the unevennesses of the ground independently of the position of said motor vehicle 2.

Figure 2:
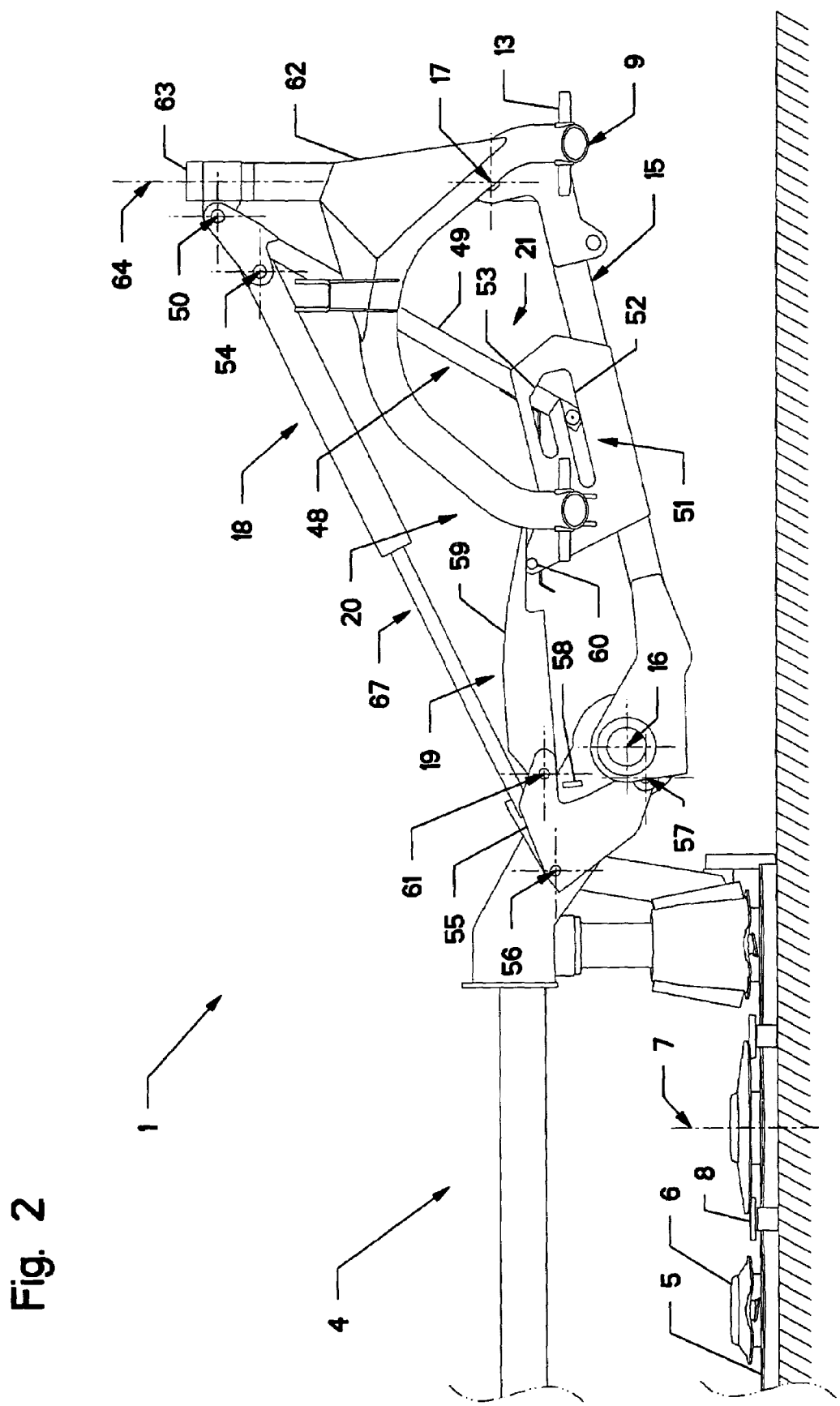
FIG. 2 shows, seen from in front and on another scale, an agricultural mower according to the present invention in working position.

Said mower 1 also comprises an operating member 18 intended to pivot said cutting mechanism 4 upward. Said operating member 18 thus allows the user to bring said mower 1 from a working position to a transport position and vice versa. In the working position as shown in FIGS. 1 and 2, said cutting mechanism 4 extends to the side of said motor vehicle 2 and said gearbox 5 rests at least partially on the ground. Said mower 1 is thus capable of cutting the standing product. In transport position and in the light of FIG. 6, said cutting mechanism 4 is returned by pivoting substantially into the extension of said motor vehicle 2 in order to make the bulk of said mower 1 compatible with the laws governing traffic on the public highway.

Figure 3:
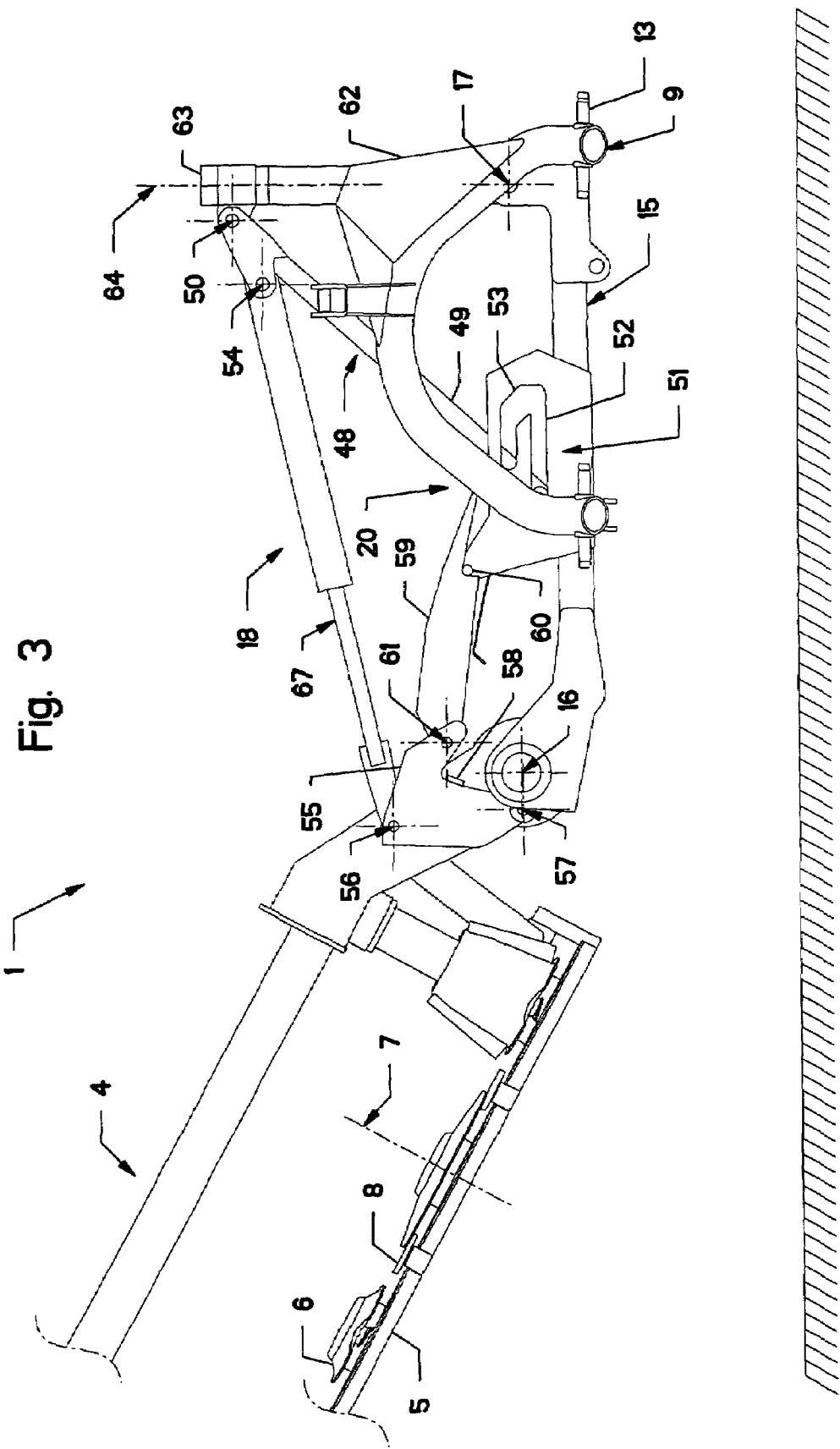
FIG. 3 shows the mower of FIG. 2 in the intermediate position.

Said mower 1 also comprises a limiter device 19 intended to limit the upward pivoting of said cutting mechanism 4 relative to said carrier beam 15 about said first articulation 16 in order to stop said cutting mechanism 4 in an intermediate position when said operating member 18 is actuated. In this intermediate position as shown in FIG. 3, said cutting mechanism 4 again extends to the side of said motor vehicle 2 but said gearbox 5 is lifted off from the ground in order to be able to pass over the standing product or the product already cut. This intermediate position of said mower 1 is used mainly during headland maneuvers.

According to an important feature of the present invention, said mower 1 also comprises a device 20 intended to automatically render said limiter device 19 inactive when said hitch structure 9 occupies a raised position relative to the ground.

Accordingly, said device 20 comprises a detection means 21 and an actuator means 22. Said detection means 21 is intended to determine whether said hitch structure 9 is in raised position relative to the ground. For its part, said actuator means 22 is intended to act on said limiter device 19 in order to render it inactive. Said detection means 21 and said actuator means 22 are connected to one another so that said actuator means 22 can be controlled by said detection means 21.

There are different ways of determining whether said hitch structure 9 is in raised position relative to the ground. Accordingly, said detection means 21 may for example measure the distance separating said hitch structure 9 from said ground. If this measurement exceeds a predetermined threshold, said detection means 21 will deduce therefrom that said hitch structure 9 is in raised position. Preferably, said predetermined threshold is adjustable in order that detection of the raised position of said hitch structure 9 is not disrupted by the unevennesses of the ground. Another way of proceeding consists in measuring the pivot angle between said hitch structure 9 and said carrier beam 15 at said second articulation 17. This pivot angle of course varies during work due to the unevennesses of the ground but within a relatively narrow range. On the other hand, when said hitch structure 9 occupies a raised position relative to the ground, this pivot angle is much greater. By detecting a large value of this pivot angle, said detection means 21 is capable of determining whether said hitch structure 9 is in raised position.

The rest of the description will now give more ample details on possible embodiments of said detection means 21.

To measure the distance separating said hitch structure 9 from said ground and according to the exemplary embodiment shown in FIGS. 8 to 10, said detection means 21 comprises a measurement member 68 intended to be in contact with the ground. One end of said measurement member 68 is connected to said cutting machine, preferably to said hitch structure 9, by means of a pivot articulation 23 whose axis is directed transverse to said direction of travel 3. In the light of FIG. 8, the length of said measurement member 68 is defined so that the other end of said measurement member 68 touches the ground when said hitch structure 9 is in working position. Said measurement member 68 then advantageously extends downward and rearward. On the other hand, with reference to FIG. 9, the length of said measurement member 68 is such that the latter no longer touches the ground when said hitch structure 9 is in raised position. Said measurement member 68 then occupies a substantially vertical position. By detecting this substantially vertical position of said measurement member 68, said detection means 21 is capable of determining whether said hitch structure 9 is in raised position relative to the ground. Accordingly and more precisely in the light of FIG. 10, said detection means 21 comprises for example a contactor 66 against which said measurement member 68 rests when in its substantially vertical position. When activated, said contactor 66 sends a signal to said actuator means 22 so that the latter renders said limiter device 19 inactive. According to the exemplary embodiment shown in FIG. 7, and in preferential manner, said detection means 21 measures the distance separating said hitch structure 9 from said ground without being in contact with said ground. In particular this prevents the problems of friction wear that may be encountered with the solutions requiring a contact with the ground. To do this, said detection means 21 comprises a wave generator 24 connected to said cutting machine 1, preferably to said hitch structure 9. Said wave generator 24 is intended to emit a wave toward the ground and to measure the time taken by that wave to return to it after having being reflected by the ground. The type of wave generated may be of the electromagnetic type such as a laser beam or a radar echo, or of the acoustic type for example ultrasound. If the time taken by the wave to travel the distance is greater than a certain predefined value, said detection means 21 then deduces therefrom that said hitch structure 9 is in raised position relative to the ground. In such a case, said detection means 21 sends a signal to said actuator means 22 in order for the latter to render said limiter device 19 inactive. According to another exemplary embodiment, said measurement member 68 or said wave generator 24 is not connected to said hitch structure 9 but to said carrier beam 15 in the immediate vicinity of said second articulation 17 so that the measurement made is influenced minimally by the pivoting of said carrier beam 15 relative to said hitch structure 9.

As previously announced, another way of determining whether said hitch structure 9 occupies a raised position relative to the ground consists in measuring the pivot angle between said hitch structure 9 and said carrier beam 15. To do this, said detection means 21 comprises for example an angle sensor arranged in the vicinity of said second articulation 17. In the exemplary embodiments shown in FIGS. 11 and 12, this measurement of the pivot angle is carried out more precisely by measuring a distance between a point of said hitch structure 9 which is distant from the axis of said second articulation 17 and a point of said carrier beam 15 which is distant from the axis of said second articulation 17.

Figure 11:
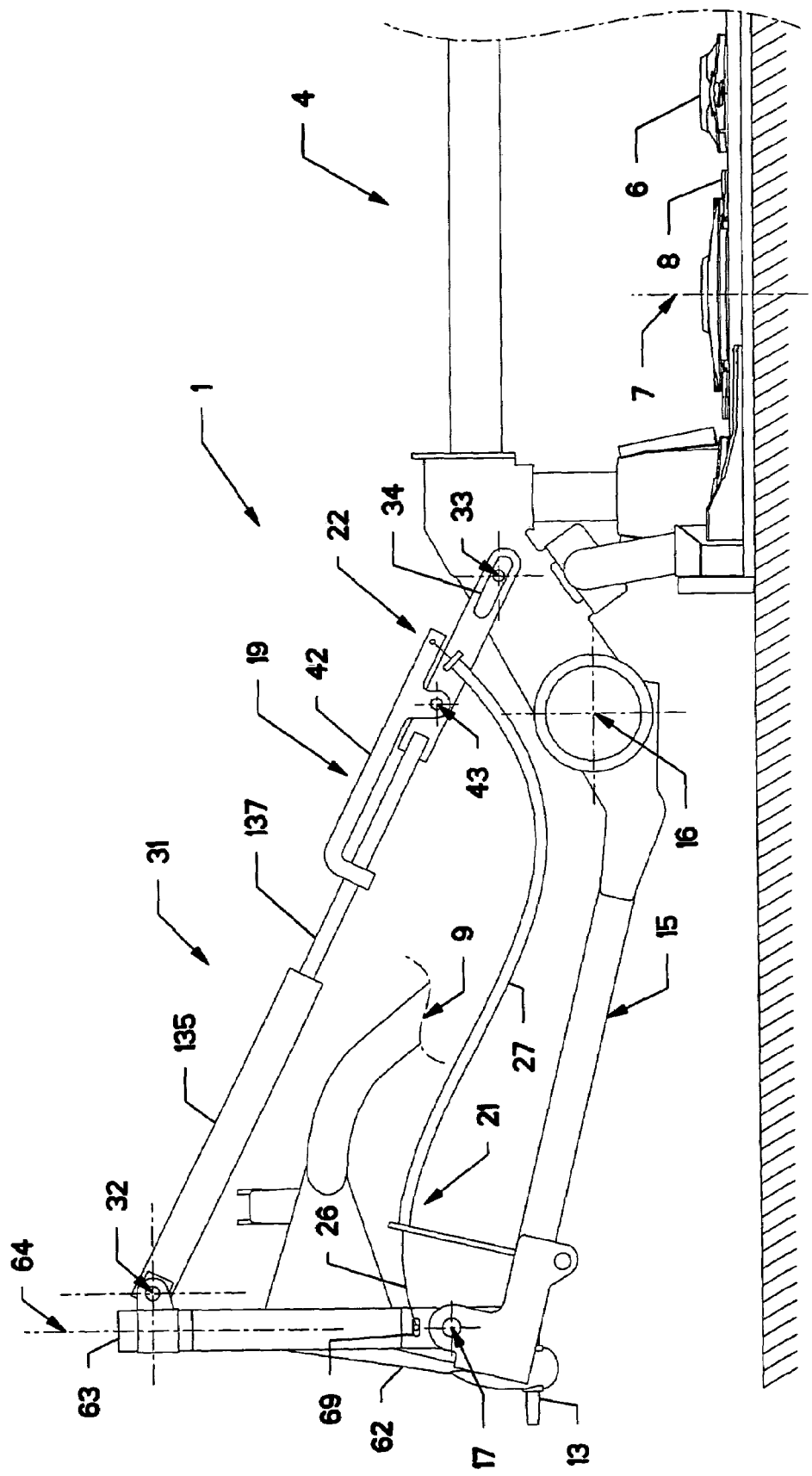
FIG. 11 shows, seen from behind, another exemplary embodiment of an agricultural mower according to the present invention.

Accordingly, and in the light of FIG. 11, said detection means 21 comprises a cable 26 inserted in a sheath 27. One end of said cable 26 is connected to said hitch structure 9 while one end of said sheath 27 is connected to said carrier beam 15. Thus, when said hitch structure 9 is raised from the ground, the pivoting of said carrier beam 15 relative to said hitch structure 9 about said second articulation 17 causes said cable 26 to slide inside said sheath 27. This sliding of said cable 26 is then used to control said actuator means 22. In a preferential manner, the connection between said sheath 27 and said carrier beam 15 and/or the connection between said cable 26 and said hitch structure 9 is/are achieved by means of an opening 69 allowing a certain clearance. This clearance is great enough in order that the angular deflections generated by the unevennesses of the ground cannot cause a sliding of said cable 26. According to another exemplary embodiment shown in FIG. 12, said detection means 21 this time comprises a cylinder 28 one of whose ends is connected to said hitch structure 9 by means of a pivot articulation 29 whose axis is substantially parallel to the axis of said second pivot articulation 17. The other end of said cylinder 28 is connected to said carrier beam 15 by means of another pivot articulation 30 whose axis is substantially parallel to the axis of said second pivot articulation 17. Thus, when said hitch structure 9 is raised from the ground, the pivoting of said carrier beam 15 relative to said hitch structure 9 about said second articulation 17 causes a variation in the length of said cylinder 28. This variation in length causes a variation in the volume of oil contained in said cylinder 28. This variation in the volume of oil is then used to control said actuator means 22. In preferential manner, the connection between said cylinder 28 and said carrier beam 15 and/or the connection between said cylinder 28 and said hitch structure 9 is/are achieved by means of an opening 70 allowing a certain clearance. This clearance is great enough in order that the angular deflections generated by the unevennesses of the ground cannot cause a variation in the volume of oil inside said cylinder 28 and hence an inappropriate control of said actuator means 22.

Just as there are various ways of determining whether said hitch structure 9 occupies a raised position relative to the ground, there are also various possibilities for limiting the pivoting of said cutting mechanism 4 when said operating member 18 is actuated. Specifically, said limiter device 19 may for example act on said operating member 18 in order to prematurely stop the action of the latter. According to another possible approach, said limiter device 19 this time acts on said cutting mechanism 4 in order to restrict its angular deflection about said first articulation 16.

The rest of the description will now give more ample details on possible embodiments of said limiter device 19 and of said actuator means 22.

Figure 7:
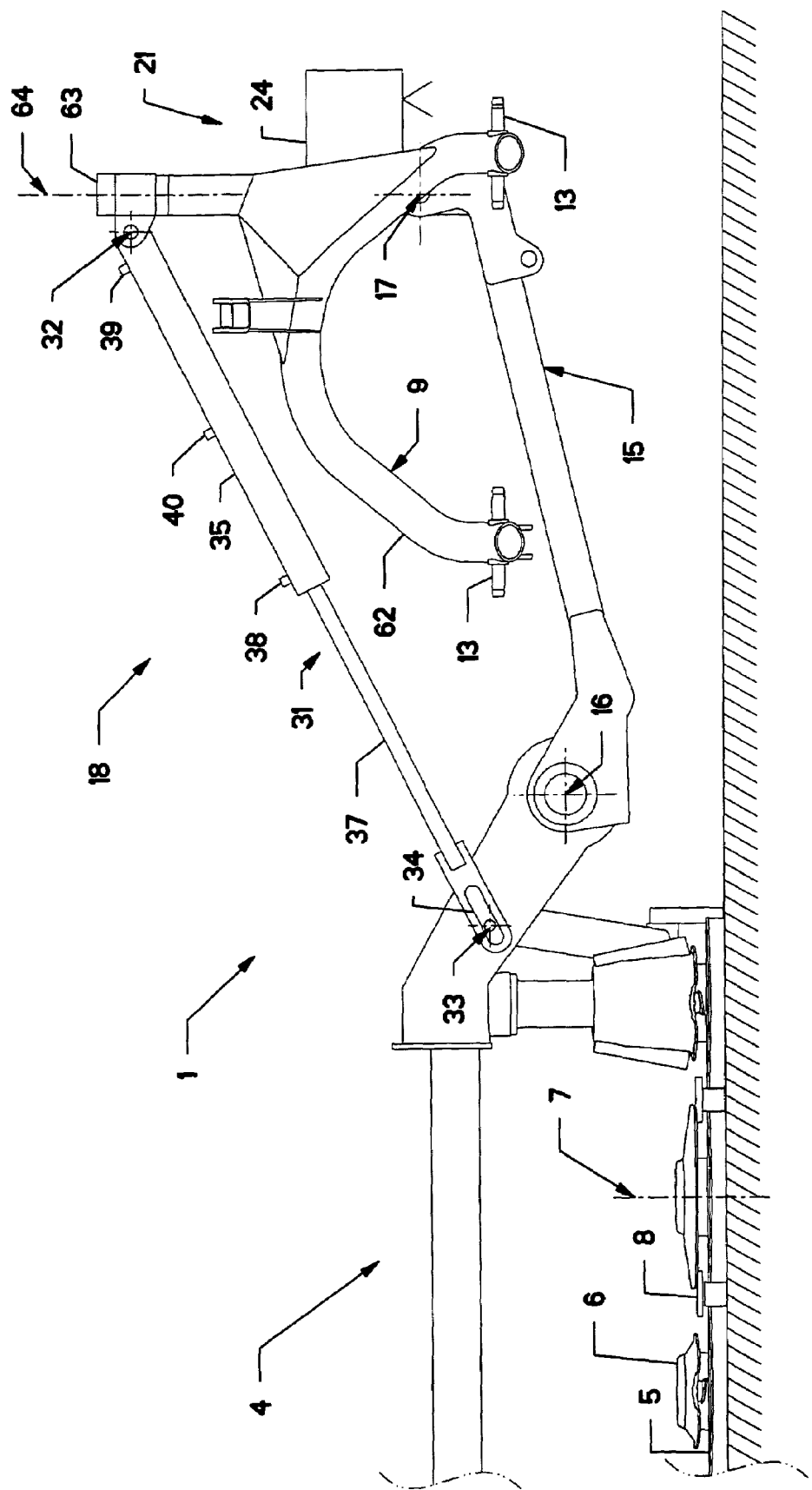
FIG. 7 shows, seen from in front, another exemplary embodiment of an agricultural mower according to the present invention.

In the two exemplary embodiments shown in FIGS. 7 and 13, and in FIG. 11, said operating member 18 is more precisely a hydraulic cylinder 31 one end of which is connected to said hitch structure 9 by means of a pivot articulation 32 whose axis is directed in said direction of travel 3. The other end of said cylinder 31 is connected to said cutting mechanism 4 by means of a pivot articulation 33 whose axis is substantially parallel to the axis of said pivot articulation 32. In a preferential manner, the connection between said hydraulic cylinder 31 and said hitch structure 9 and/or the connection between said hydraulic cylinder 31 and said cutting mechanism 4 is/are also achieved by means of an opening 34 allowing a certain clearance. This clearance allows said cutting mechanism 4 to follow the unevennesses of the ground without acting upon said cylinder 31.

Figure 13A:
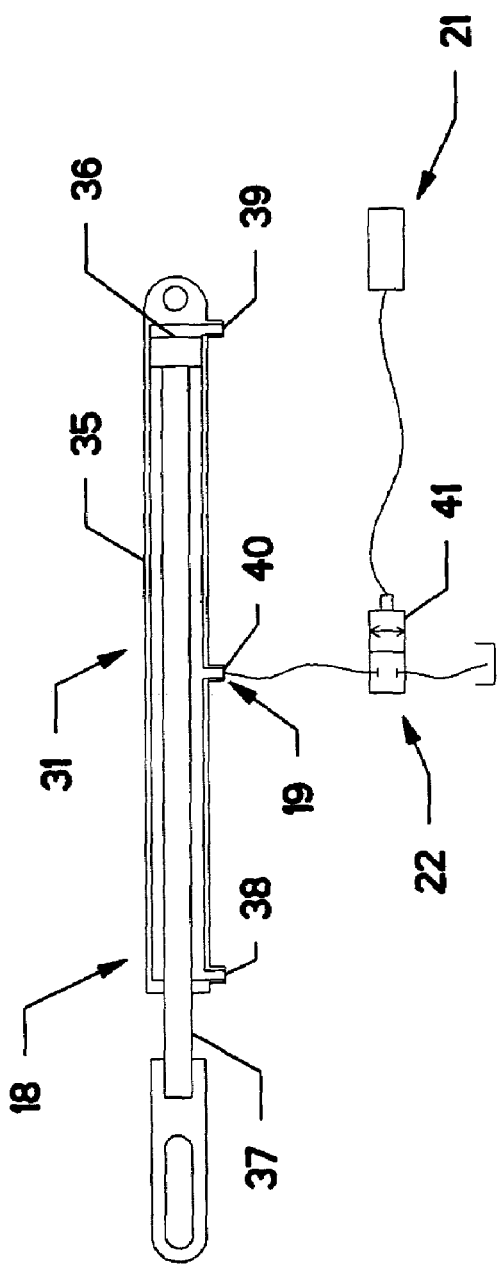
FIGS. 13a and 13b show, in section, an enlargement of the operating member visible in FIG. 7.
Figure 13B:
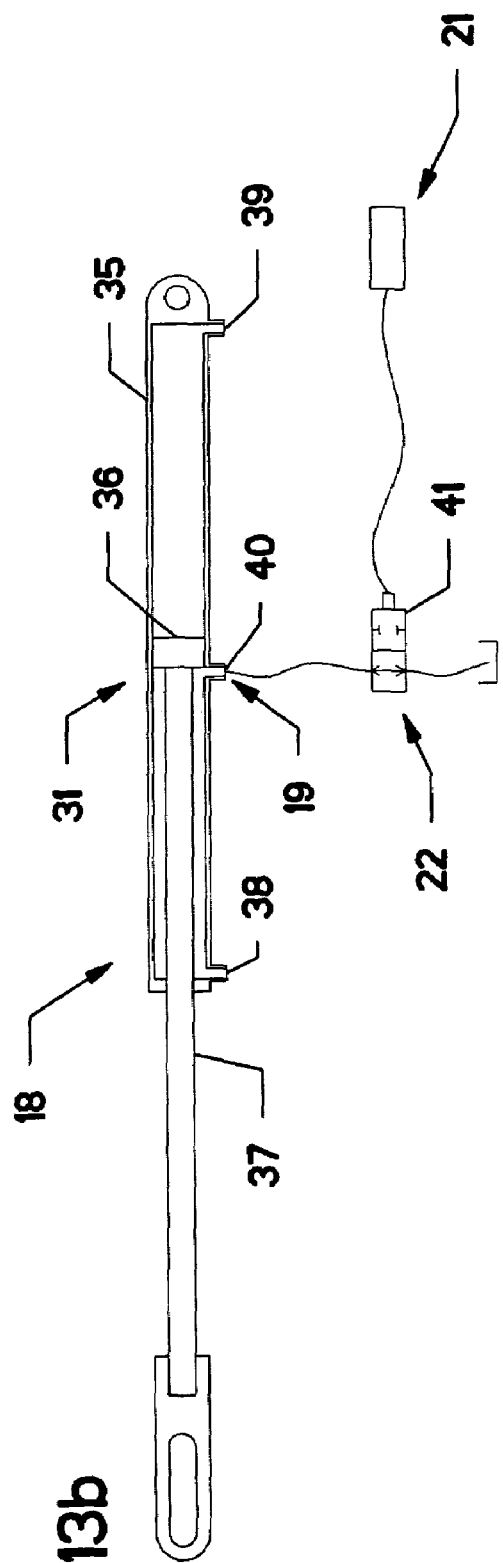

In an equally preferential manner and more precisely in the light of FIG. 13, said cylinder 31 consists of a body 35 inside which slides a piston 36. Said piston 36 is connected to a rod 37. Said cylinder 31 being of the double-acting type, said piston 36 then divides said body 35 into two chambers. Said body 35 is pierced with a first orifice 38 and a second orifice 39 each intended to supply a respective chamber with fluid. In a particularly advantageous manner, said cylinder 31 further comprises a third orifice 40 arranged along said body 35 between said first and said second orifices 38, 39. Said third orifice 40 constitutes said limiter device 19 intended to limit the pivoting of said cutting mechanism 4 when said operating member 18 is actuated. Specifically, in this exemplary embodiment, said operating member 18 operates in the following manner: when said cutting mechanism 4 rests on the ground, said piston 36 is situated between said first orifice 38 and said third orifice 40. By acting on the hydraulic circuit of said motor vehicle 2, the user sends pressurized oil into said cylinder 31 through said first orifice 38. Said piston 36 moves inside said body 35 toward said third orifice 40 while pulling with it said rod 37. Said cutting mechanism 4 then pivots upward. When said piston 36 passes the position of said third orifice 40, as shown in FIG. 13b, the pressurized oil originating from said first orifice 38 escapes via said third orifice 40. Said piston 36 then stops its progression in said body 35. The pivoting of said cutting mechanism 4 is thus stopped in said intermediate position. In this exemplary embodiment, one of the possibilities of rendering said limiter device 19 inactive, consists in preventing any outflow of oil via said third orifice 40. To do this, said actuator means 22 is formed by a valve 41 placed between said third orifice 40 and the hydraulic circuit of said motor vehicle 2. Said detection means 21 controls said valve 41 in order to open it when said hitch structure 9 is in the lowered position. On the other hand, if said hitch structure 9 is in raised position, said detection means 21 controls the closing of said valve 41. Thus, when said piston 36 passes the position of said third orifice 40, said valve 41 being closed, the pressurized oil originating from said first orifice 38 can therefore not escape via said third orifice 40. Said piston 36 then continues its travel to reach the end of said body 35 as shown in FIG. 13a. Said cutting mechanism 4 is then pivoted into its transport position. In the exemplary embodiment shown in FIGS. 7 and 13, said valve 41 is an electrovalve. However, depending on the detection means 21 employed to detect the raised position of said hitch structure 9, said valve 41 may also be controlled hydraulically or mechanically.

The exemplary embodiment represented in FIG. 11 shows another way of acting on said cylinder 31 in order to prematurely stop the action of the latter. Specifically, said cylinder 31 consists this time of a body 135 inside which slides a piston. Said piston is connected to a rod 137. Said limiter device 19 this time is achieved by means of a stop 42 connected to said rod 137 by means of a pivot articulation 43. Said stop 42 is intended to limit the retraction travel of said cylinder 31 by pressing against said body 135. To render this limiter device 19 inactive, said actuator means 22 pivots said stop 42 about said articulation 43 so that said stop 42 can no longer press against said body 135 when said rod 37 retracts. In the light of FIG. 11, said actuator means 22 may be achieved by connecting the other end of said cable 26 to said stop 42 and by connecting the other end of said sheath 27 to said rod 137. Thus the traction on said cable 26 generated by placing said hitch structure 9 in raised position is transmitted to said stop 42 so as to make the latter pivot. According to other exemplary embodiments not shown, the pivoting of said stop 42 intended to render said limiter device 19 inactive is caused by an electric actuator, such as a motor, or by a hydraulic actuator, such as a cylinder.

In a preferential manner in the exemplary embodiments shown in FIGS. 7 and 11, the positions of said first articulation 16, of said second articulation 17 and of the articulations 32, 33 of said cylinder 31 are determined mainly according to the position of the center of gravity of said cutting mechanism 4. Thus the shortening of said cylinder 31 also generates an upward torque about said second articulation 17 so as to be able to lift off said cutting mechanism 4 from the ground. With the same aim and according to another exemplary embodiment, said mower 1 also comprises a second limiter device intended in particular to limit the downward pivoting about said second articulation 17 of said carrier beam 15 relative to said hitch structure 9. Such a second limiter device will be described later in greater detail.

Figure 14:
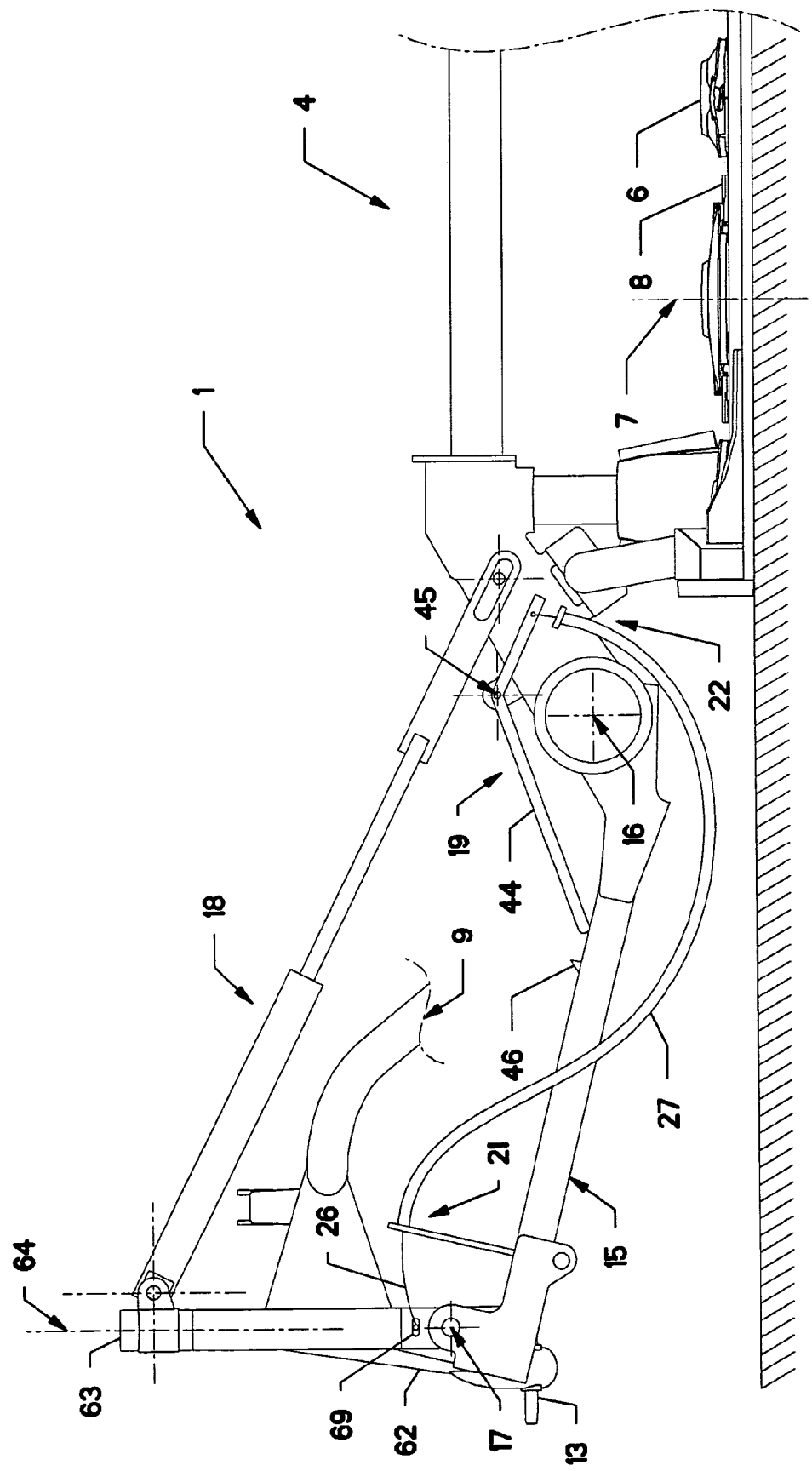
FIG. 14 shows, seen from behind, another exemplary embodiment of an agricultural mower according to the present invention.
Figure 15:
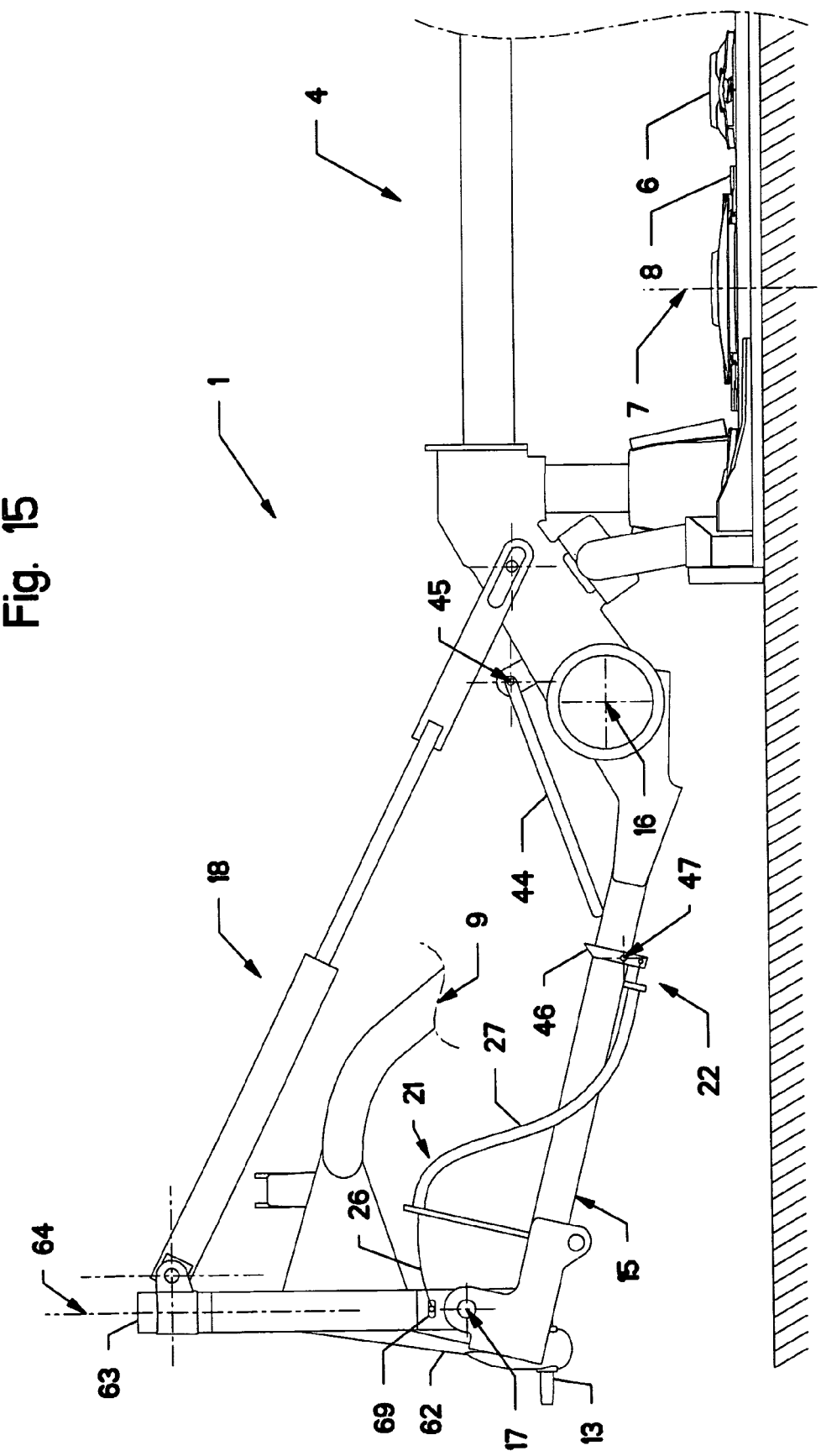
FIG. 15 shows, seen from behind, another exemplary embodiment of an agricultural mower according to the present invention.

According to two other exemplary embodiments shown in FIGS. 14 and 15, said limiter device 19 acts this time on said cutting mechanism 4 so as to restrict its angular deflection about said first articulation 16. In the light of FIG. 14, said limiter device 19 is achieved by means of a connecting rod 44 connected in pivoting manner to said cutting mechanism 4 by means of an articulation 45 whose axis is substantially parallel to the axis of said first articulation 16. One end of said connecting rod 44 is intended to press against a stop 46 placed on said carrier beam 15. To render said limiter device 19 inactive, said actuator means 22 pivots said connecting rod 44 about said articulation 45 so that said connecting rod 44 can no longer press against said stop 46 when said operating member 18 is actuated. To do this, said actuator means 22 may be achieved by connecting the other end of said cable 26 to said connecting rod 44 and by connecting the other end of said sheath 27 to said cutting mechanism 4. Thus the traction on said cable 26 generated by placing said hitch structure 9 in raised position is transmitted to said connecting rod 44 so as to cause the latter to pivot. According to other exemplary embodiments not shown, the pivoting of said connecting rod 44 intended to render said limiter device 19 inactive is generated by an electric actuator, such as a motor, or by a hydraulic actuator, such as a cylinder. With reference to FIG. 15, said stop 46 is this time connected in pivoting manner to said carrier beam 15 by means of an articulation 47. To render said limiter device 19 inactive, said actuator means 22 then pivots said stop 46 about said articulation 47 so that said connecting rod 44 can no longer press against said stop 46 when said operating member 18 is actuated. To do this, said actuator means 22 may be achieved by connecting the other end of said cable 26 to said stop 46 and by connecting the other end of said sheath 27 to said carrier beam 15. Thus the traction on said cable 26 generated by placing said hitch structure 9 in raised position is transmitted to said stop 46 so as to make the latter pivot. According to other exemplary embodiments not shown, the pivoting of said stop 46 intended to render said limiter device 19 inactive is generated by an electric actuator, such as a motor, or by a hydraulic actuator, such as a cylinder.

It is notable in the exemplary embodiments employing a cable 26 sliding in a sheath 27 that said sheath 27 is flexible. As a result, the ends of said sheath 27 may advantageously move relative to one another according to the relative movements between the parts supporting said sheath 27.

In the light of the exemplary embodiments described and shown in the figures, said device 20 intended to render said limiter device 19 inactive may be achieved by any possible combinations between the various detection means 21 and the various actuator means 22 described hereinabove.

Figure 4:
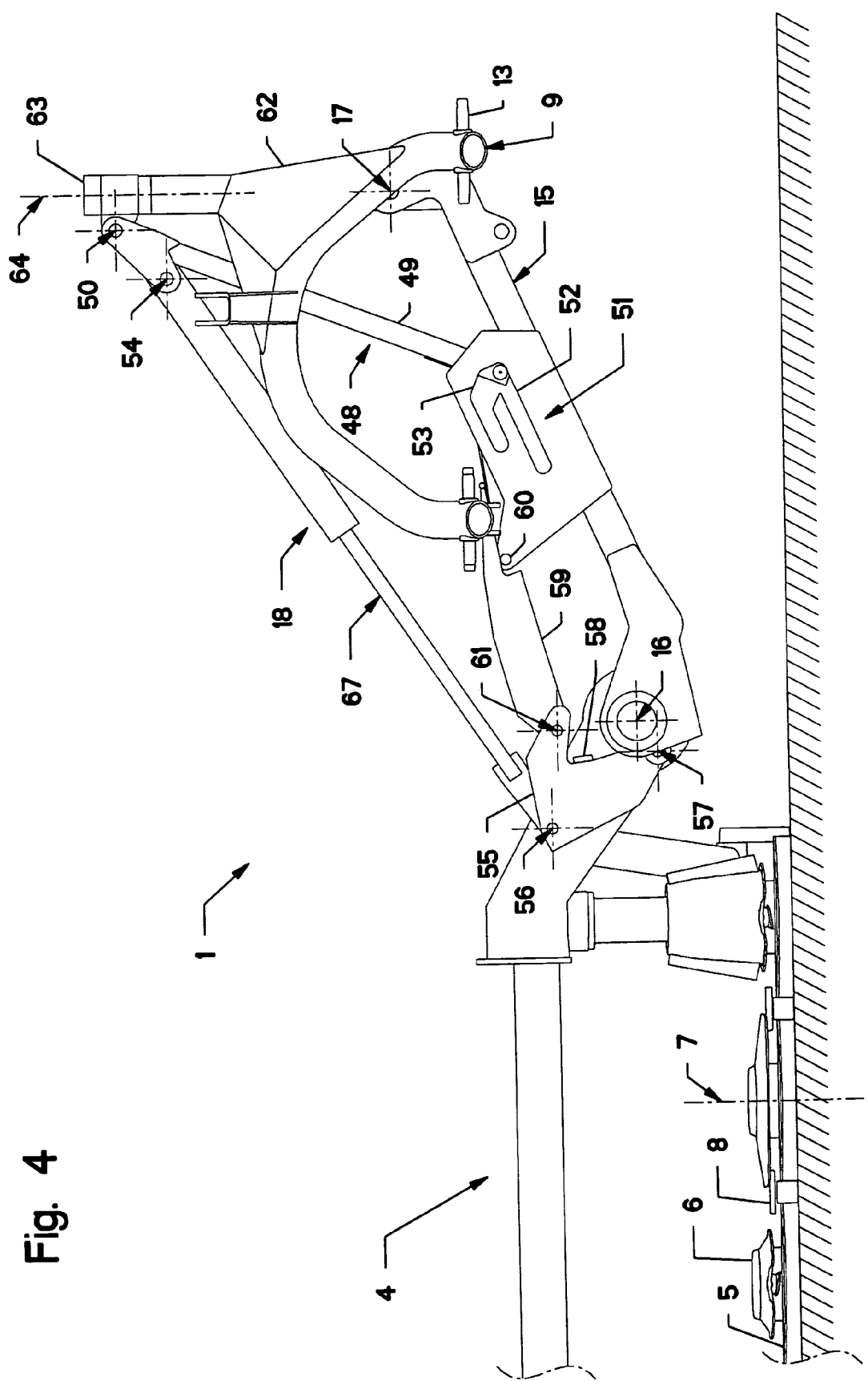
FIG. 4 shows the mower of FIG. 2, the hitch structure being in raised position relative to the ground.
Figure 5:
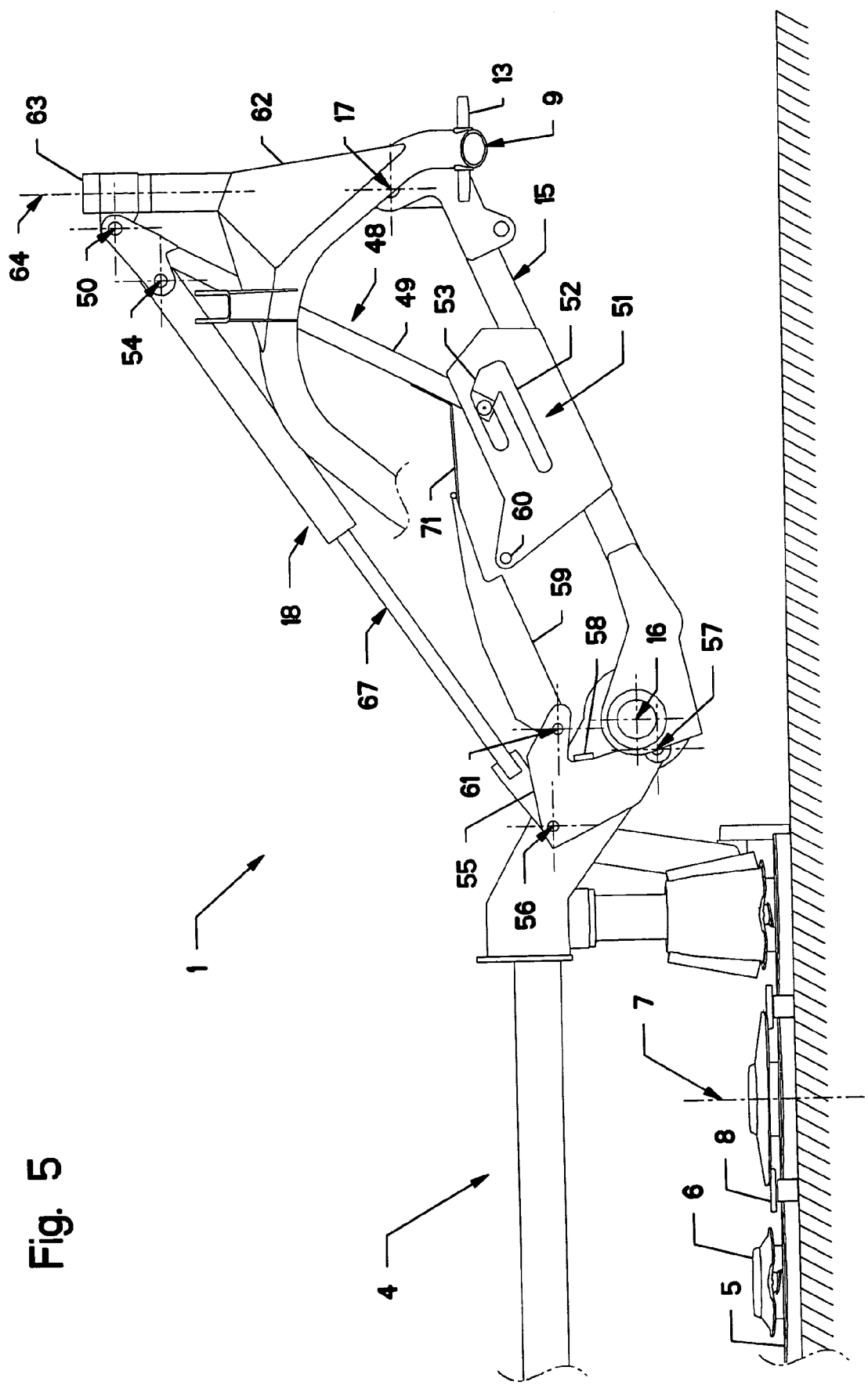
FIG. 5 shows the mower of FIG. 4 during activation of the operating member, the hitch structure being in raised position relative to the ground.
Figure 6:
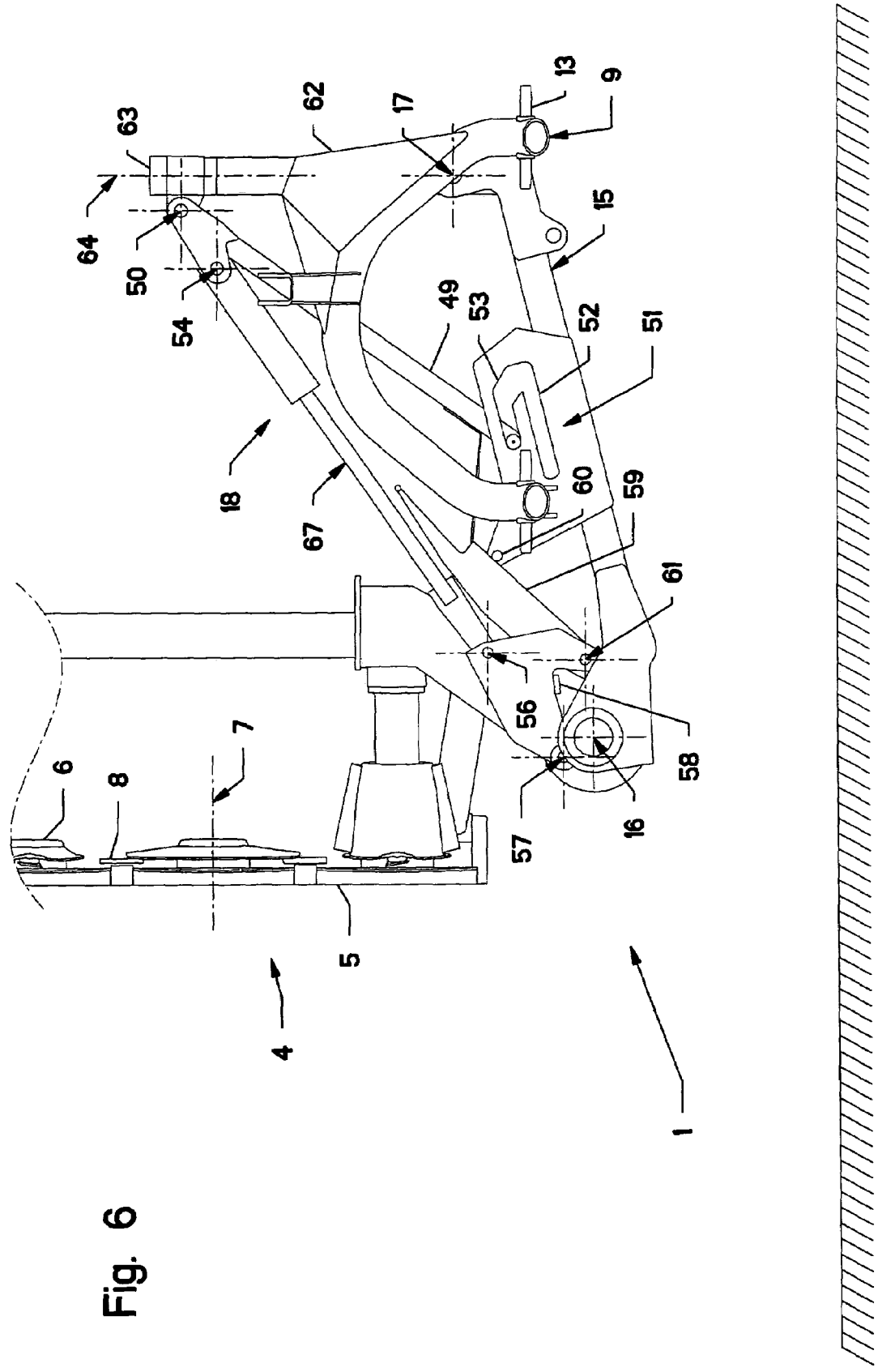
FIG. 6 shows the mower of FIG. 2 in transport position.

FIGS. 2 to 6 further show another exemplary embodiment in which said mower 1 in addition comprises a second limiter device 48 intended to limit the pivoting about said second articulation 17 of said carrier beam 15 relative to said hitch structure 9. Accordingly, said second limiter device 48 comprises a connecting rod 49. One end of said connecting rod 49 is connected in pivoting manner to said hitch structure 9 by means of an articulation 50 whose axis is substantially parallel to the axis of said second articulation 17. The other end of said connecting rod 49 slides inside a groove 51 provided on said carrier beam 15. The dimensions of said groove 51 determine the amplitude of movement that said carrier beam 15 can have relative to said hitch structure 9. In preferential manner, said groove 51 comprises two branches 52, 53 disposed one above the other and connected together by one of their ends. Thus, seen from behind, said groove 51 substantially takes the shape of the letter "C". In the light in particular of FIG. 2, when said hitch structure 9 is in lowered position, the end of said connecting rod 49 slides in the bottom branch 52 of said groove 51. On another hand, in the light of FIG. 5, when said hitch structure 9 is in raised position, the end of said connecting rod 49 slides in the top branch 53 of said groove 51. In a particularly advantageous manner, said connecting rod 49 and said groove 51 thus constitute said detection means 21 capable of detecting a raised position of said hitch structure 9. In a preferential manner, said operating member 18 is a cylinder 67 one end of which is connected in pivoting manner to said connecting rod 49 by means of a pivot articulation 54 whose axis is substantially parallel to the axis of said second articulation 17. The other end of said cylinder 67 is connected in pivoting manner to a second connecting rod 55 by means of a pivot articulation 56 whose axis is substantially parallel to the axis of said second articulation 17. Said second connecting rod 55 is connected in pivoting manner to said cutting mechanism 4 by means of a pivot articulation 57 whose axis is substantially parallel to the axis of said second articulation 17. In working position and in the light of FIG. 2, said second connecting rod 55 allows said cutting mechanism 4 to pivot about said first articulation 16 without acting on said cylinder 67. For its part, said carrier beam 15 can pivot about said second articulation 17 within the limits allowed by said bottom branch 52. When the user supplies said cylinder 67 with pressurized fluid in order to shorten it, said second connecting rod 55 pivots about said articulation 57 until it butts against a stop 58 provided on said cutting mechanism 4. An additional shortening of said cylinder 67 causes said cutting mechanism 4 to pivot about said first articulation 16 and said second articulation 17. Advantageously, the force generated by said cylinder 31 generates a torque on said connecting rod 49 about said articulation 50. This torque on said connecting rod 49 participates, via said groove 51, in the creation of another upward torque on said carrier beam 15 about said second articulation 17. Thus said cutting mechanism 4 will first be raised while remaining substantially parallel to the ground before pivoting clearly about said first articulation 16. This prevents said cutting mechanism 4, above all said gearbox 5, from marking the ground when placed in the intermediate position. Other details concerning the creation of the torque about said second articulation 17 have been given during the description of the exemplary embodiments shown in FIGS. 7 and 11. With reference to FIG. 3, the pivoting about said second articulation 17 stops when said connecting rod 49 presses against the end of said bottom branch 52. For its part, the pivoting about said first articulation 16 stops when a third connecting rod 59 presses against a stop 60 provided on said carrier beam 15. Said third connecting rod 59 and said stop 60 then constitute said first limiter device 19. Said third connecting rod 59 is for example connected in pivoting manner to said cutting mechanism 4. However, in this exemplary embodiment, said third connecting rod 59 is advantageously connected in pivoting manner to said second connecting rod 55 by means of an articulation 61 whose axis is substantially parallel to the axis of said second articulation 17. Thus, in the intermediate position as shown in FIG. 3, the forces generated by said third connecting rod 59 to stop said cylinder 67 do not pass through said cutting mechanism 4 but only through said second connecting rod 55. This prevents unnecessary action on said cutting mechanism 4. FIGS. 4 to 6 illustrate various steps during the transition from a working position to a transport position. Beginning with the working position and in the light of FIG. 4, the user first acts on said hitch device 10 of said motor vehicle 2 to place said hitch structure 9 in raised position. In this process, the end of said connecting rod 49 slides as far as the junction zone between said bottom branch 52 and said top branch 53 of said groove 51. Then, in the light of FIG. 5, the user supplies said cylinder 67 with pressurized fluid in order to shorten it. With this shortening of said cylinder 67, said second connecting rod 55 pivots about said articulation 57 until it butts against said stop 58 provided on said cutting mechanism 4. An additional shortening of said cylinder 67 causes the end of said connecting rod 49 to rise into the top branch 53 of said groove 51. In a particularly advantageous manner, this raising of the end of said connecting rod 49 in said top branch 53 is employed to render said first limiter device 19 inactive. Thus in the exemplary embodiment shown in FIGS. 2 to 6, a metal strip 71 is provided rigidly connected to said connecting rod 49. Said metal strip 71 is intended to act on said third connecting rod 59 when the end of said connecting rod 49 rises into said top branch 53, in order that said third connecting rod 59 can then no longer butt against said stop 60. With reference to FIG. 6, said cylinder 67 may thus continue its retraction until it brings said mower 1 to transport position. In this exemplary embodiment, said connecting rod 49, said cylinder 67 and said metal strip 71 thus constitute said actuator means 22.

The mower 1 which has just been described is only one example which may under no circumstances limit the invention. Modifications remain possible particularly in relation to the constitution of the various elements or by substitution of technical equivalents without in any way departing from the field of protection defined by the following claims.

Thus, said hitch structure 9 may more precisely comprise a frame 62 and a shaft 63. Said shaft 63 is connected to said frame 62 by means of a pivot articulation 64 whose axis is directed upward. Said frame 62 supports said hitch points 13, 14. In this case, said carrier beam 15 and said operating member 18 are more precisely connected to said shaft 63. A safety device 65 is also provided, intended to prevent, during normal working conditions, any pivoting about said articulation 64. On the other hand, in the event of an encounter with an obstacle, said safety device 65 releases, thereby allowing said cutting mechanism 4 and said carrier beam 15 to pivot backward relative to said motor vehicle 2. In the exemplary embodiment shown in FIG. 1, said safety device 65 is connected on the one hand to said frame 62 and on the other hand to said carrier beam 15. The threshold for releasing said safety device 65 is advantageously adjustable. Such a safety device 65 is known to those skilled in the art and will therefore not be described further.

Said mower 1 may again comprise a lightening device intended during work to transfer at least a portion of the weight of said cutting mechanism 4 onto said motor vehicle 2. This reduces the pressure of said cutting mechanism 4 on the ground during work thereby providing a mower 1 requiring less traction power and being more respectful of the plant cover. Such a lightening device is known to those skilled in the art. It comprises for example traction springs placed between said hitch structure 9 and said cutting mechanism 4.

In addition, said cutting mechanism 4 may further comprise a conditioning device intended to accelerate the drying of the cut product.

What is claimed as new desired to be secured by Letters Patent of the United States is:

1. Cutting machine comprising:
   a cutting mechanism,
   a hitch structure configured to be connected to a hitch device of a motor vehicle, said hitch structure being configured to be raised or lowered relative to the ground,
   a carrier beam connected on the one hand to said cutting mechanism by means of a first pivot articulation whose axis is at least substantially directed along a direction of work, and on the other hand to said hitch structure by means of a second pivot articulation whose axis is substantially parallel to the axis of said first pivot articulation,
   an operating member configured to cause said cutting mechanism to pivot from a working position in which said cutting mechanism rests at least partially on the ground, to a transport position in which said cutting mechanism is pivoted upward, and
   a limiter device configured to limit the upward pivoting of said cutting mechanism relative to said carrier beam about said first pivot articulation, so as to stop said cutting mechanism in an intermediate position when said operating member is actuated,
   which also comprises a device configured to automatically render said limiter device inactive when said hitch structure occupies a raised position relative to the ground.

2. The cutting machine as claimed in claim 1, wherein said device provided to render said limiter device inactive comprises a detection means configured to determine whether said hitch structure is in the raised position relative to the ground, and an actuating means configured to act on said limiter device in order to render the latter inactive.

3. The cutting machine as claimed in claim 2, wherein said detection means comprises a measurement members, one end of which is connected to said cutting machine, the other end of said measurement member being configured to come into contact with the ground.

4. The cutting machine as claimed in claim 3, wherein the end of said measurement member is connected to said hitch structure by means of a third pivot articulation whose axis is directed transverse to said direction of travel, and wherein the length of said measurement member is defined such that the other end of said measurement member touches the ground when said hitch structure is in working position, and such that this other end of said measurement member no longer touches the ground when said hitch structure is in the raised position.

5. The cutting machine as claimed in claim 2, wherein said detection means comprises a wave generator connected to said hitch structure, said wave generator being configured to emit a wave toward the ground and to measure the time taken by this wave to return to it after having been reflected by the ground.

6. The cutting machine as claimed in claim 2, wherein said detection means comprises a sensor configured to measure the pivot angle about said second articulation between said hitch structure and said carrier beam.

7. The cutting machine as claimed in claim 2, wherein said detection means comprises a cable inserted in a sheath, one end of said cable being connected to said hitch structure and one end of said sheath being connected to said carrier beam such that, when said hitch structure is raised from the ground, the pivoting of said carrier beam relative to said hitch structure about said second articulation causes said cable to slide inside said sheath.

8. The cutting machine as claimed in claim 7, wherein the connection between said sheath and said carrier beam and/or the connection between said cable and said hitch structure is achieved by means of an opening allowing a certain clearance, this clearance being great enough in order that the angular deflections about said second articulation generated by the unevenness of the ground cannot cause said cable to slide inside said sheath.

9. The cutting machine as claimed in claim 2, wherein said detection means comprises a cylinder, one of the ends of said cylinder being connected to said hitch structure by means of a fourth pivot articulation whose axis is substantially parallel to the axis of said second pivot articulation, and the other end of said cylinder being connected to said carrier beam by means of a fifth pivot articulation whose axis is substantially parallel to the axis of said second pivot articulation, such that, when said hitch structure is raised from the ground, the pivoting of said carrier beam relative to said hitch structure about said second articulation causes a variation in the length of said cylinder.

10. The cutting machine as claimed in claim 2, wherein said operating member is a hydraulic cylinders, one end of which is connected to said hitch structure by means of a sixth pivot articulation whose axis is directed in said direction of travel, the other end of said cylinder being connected to said cutting mechanism by means of a seventh pivot articulation whose axis is substantially parallel to the axis of said sixth pivot articulation.

11. The cutting machine as claimed in claim 10, wherein said cylinder consists of a body inside which slides a piston, said piston dividing said body into two chambers, said body being pierced with a first orifice and a second orifice each configured to supply a respective chamber with fluid, and wherein said limiter device, configured to limit the pivoting of said cutting mechanism when said operating member is actuated, is achieved by means of a third orifice disposed along said body between said first and said second orifices.

12. The cutting machine as claimed in claim 11, wherein said actuator means is achieved by a valve placed between said third orifice and the hydraulic circuit of said motor vehicle, said valve being controlled by said detection means so as to be open when said hitch structure is in working position, and so as to be closed when said hitch structure is in the raised position.

13. The cutting machine as claimed in claim 10, wherein said limiter device is achieved by means of a stop connected to a rod of said cylinder by means of an eighth pivot articulation, said stop being configured to limit the retraction of said cylinder by pressing against the body of said cylinder.

14. The cutting machine as claimed in claim 2, wherein said limiter device is achieved by means of a connecting rod connected in a pivoting manner to said cutting mechanism by means of a ninth articulation whose axis is substantially parallel to the axis of said first articulation, one end of said connecting rod being configured to press against a stop placed on said carrier beam so as to restrict the angular deflection of said cutting mechanism about said first articulation.

15. The cutting machine as claimed in claim 14, wherein, to render said limiter device inactive, said actuator means pivots said connecting rod about said ninth articulation so that said connecting rod can no longer press against said stop when said operating member is actuated.

16. The cutting machine as claimed in claim 14, wherein said stop is connected in pivoting manner to said carrier beam by means of a tenth articulation, and wherein to render said limiter device inactive, said actuator means pivots said stop about said articulation so that said connecting rod can no longer press against said stop when said operating member is actuated.

17. The cutting machine as claimed in claim 2, which also comprises a second limiter device configured to limit the pivoting about said second articulation of said carrier beam relative to said hitch structure.

18. The cutting machine as claimed in claim 17, wherein said second limiter device comprises a connecting rod, one end of said connecting rod being connected in pivoting manner to said hitch structure by means of an eleventh articulation whose axis is substantially parallel to the axis of said second articulation, the other end of said connecting rod sliding inside a groove provided on said carrier beam.

19. The cutting machine as claimed in claim 18, wherein said groove comprises two branches disposed one above the other and interconnected by one of their ends so that:

the end of said connecting rod slides in the bottom branch of said groove when said hitch structure is in working position, and the end of said connecting rod slides in the top branch of said groove when said hitch structure is in the raised position.

20. The cutting machine as claimed in claim 19, wherein said operating member is a cylinder of which one end is connected in pivoting manner to said connecting rod by means of a twelfth pivot articulation whose axis is substantially parallel to the axis of said second articulation, the other end of said cylinder being connected in pivoting manner to a second connecting rod by means of a thirteenth pivot articulation whose axis is substantially parallel to the axis of said second articulation, said second connecting rod being connected in pivoting manner to said cutting mechanism by means of a fourteenth pivot articulation whose axis is substantially parallel to the axis of said second articulation.

21. The cutting machine as claimed in claim 20, wherein a third connecting rod configured to press against a stop provided on said carrier beam is provided.

22. The cutting machine as claimed in claim 21, wherein said third connecting rod is connected in pivoting manner to said second connecting rod by means of a fifteenth articulation whose axis is substantially parallel to the axis of said second articulation.

23. The cutting machine as claimed in claim 22, wherein a metal strip is provided rigidly connected to said connecting rod, said metal strip being configured to act on said third connecting rod when the end of said connecting rod rises into said top branch such that said third connecting rod can then no longer butt against said stop.

\* \* \* \* \*